(12) United States Patent
Kim et al.

(10) Patent No.: US 8,165,190 B2
(45) Date of Patent: Apr. 24, 2012

(54) APPARATUS AND METHOD FOR SAMPLE RATE CONVERSION IN A SOFTWARE DEFINED RADIO COMMUNICATION SYSTEM

(75) Inventors: Kwang-Chul Kim, Seoul (KR); Shi-Chang Rho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 797 days.

(21) Appl. No.: 11/714,618

(22) Filed: Mar. 6, 2007

(65) Prior Publication Data

US 2007/0217560 A1    Sep. 20, 2007

(30) Foreign Application Priority Data

Mar. 6, 2006  (KR) .................. 10-2006-0020991

(51) Int. Cl.
  *H04B 1/38*    (2006.01)
  *H04L 5/16*    (2006.01)
(52) U.S. Cl. ........ 375/222; 375/219; 375/259; 375/340; 375/350; 375/355; 455/418; 455/84; 455/552.1; 455/76
(58) Field of Classification Search .................. None
  See application file for complete search history.

(56) References Cited

U.S. PATENT DOCUMENTS

| 5,841,387 | A | * | 11/1998 | VanBuskirk | ................. 341/155 |
| 6,011,538 | A | * | 1/2000 | Eglit | ............................ 345/667 |
| 6,084,916 | A | * | 7/2000 | Ott | ................................. 375/259 |
| 7,248,189 | B2 | * | 7/2007 | Sinha et al. | ..................... 341/61 |
| 7,369,637 | B1 | * | 5/2008 | Mauer | ........................... 375/372 |
| 7,403,580 | B2 | * | 7/2008 | Ishii et al. | ..................... 375/340 |
| 7,567,589 | B2 | * | 7/2009 | Caracciolo et al. | ........... 370/516 |
| 7,826,810 | B2 | * | 11/2010 | Carmel et al. | ............. 455/127.2 |
| 2003/0132808 | A1 | * | 7/2003 | Lundberg | ......................... 331/78 |
| 2006/0199550 | A1 | * | 9/2006 | Ishikawa et al. | ................ 455/84 |
| 2007/0109158 | A1 | * | 5/2007 | Katz | ................................ 341/61 |
| 2007/0205934 | A1 | * | 9/2007 | Buisson | ......................... 341/155 |
| 2008/0055123 | A1 | * | 3/2008 | De Buys | ......................... 341/61 |

FOREIGN PATENT DOCUMENTS

| JP | 2006-060721 | 3/2006 |
| KR | 10-2005-0058789 A | 6/2005 |
| KR | 10-2005-0062635 A | 6/2005 |
| KR | 10-2005-0066566 A | 6/2005 |
| KR | 10-2005-0093771 A | 9/2005 |

* cited by examiner

*Primary Examiner* — Shuwang Liu
*Assistant Examiner* — Gina McKie
(74) *Attorney, Agent, or Firm* — NSIP Law

(57) ABSTRACT

A method for converting a sample rate in a Software Defined Radio (SDR) communication system is provided. The method includes setting a sampling frequency range depending on a maximum sampling frequency and a minimum sampling frequency so as to enable support of a plurality of sample rates; if a required sampling frequency is set, determining a control value for converting the maximum sampling frequency to the required sampling frequency; and receiving a signal having the maximum sampling frequency, and converting the signal having the maximum sampling frequency to a signal having the required sampling frequency depending on the control value. The control value is determined taking into account a maximum sampling frequency for setting the sampling frequency range.

16 Claims, 4 Drawing Sheets

APPARATUS AND METHOD FOR SAMPLE RATE CONVERSION IN A SOFTWARE DEFINED RADIO COMMUNICATION SYSTEM

PRIORITY

This application claims priority under 35 U.S.C. §119(a) to a Korean Patent Application filed in the Korean Intellectual Property Office on Mar. 6, 2006 and assigned Serial No. 2006-20991, the disclosure of which is incorporated herein by reference.

BACKGROUND OF THE INVENTION

1. Field of the Invention

The present invention relates generally to a Software Defined Radio (SDR) system, and in particular, to an apparatus and method for reducing complexity and power consumption in a SDR system.

2. Description of the Related Art

Generally, mobile communication systems, which started with analog schemes in the 1980s, have converted to digital schemes in their system configuration to cope with the rapid increase in the number of users and to meet the demands for various high-speed services in the 1990s. In the 2000s, $3^{rd}$ Generation (3G) mobile communication technology for the next generation multimedia service and super high-speed data communication is being developed. In this course, emphasis is laid on system efficiency and flexibility that can be adapted to the fast-varying mobile communication environment and its relevant technology.

As the communication technology undergoes a rapid change from the analog scheme to the digital scheme, many functions of the mobile communication system, which were implemented by hardware in the existing system, are now being implemented by software. For example, an extensive study of SDR technology is being conducted. SDR technology allows a Mobile Station (MS) to use several communication schemes in software approach.

SDR technology enables reconfiguration of a wireless interface through wirelessly downloadable software. Therefore, with use of SDR technology, one platform can support various communication schemes in real time at the request of a user, or by a network manager.

In a wireless mobile communication system, most function blocks, including a Radio Frequency (RF) block, are performed by a software module which is implemented by a programmable fast processing device. Therefore, SDR technology supports multiple wireless access standards or service functions simply with reconfiguration of necessary software without hardware replacement.

Specifically, the SDR concept enables processing of Radio Frequency (RF)/Intermediate Frequency (IF) signals as well as baseband signals with use of reconfigurable devices, thereby providing a system configuration applicable to both the existing system and the new system standard. The reconfigurable devices include fast Digital Signal Processor (DSP), Field Programmable Gate Array (FPGA), and the like.

For construction of a system flexibly applicable to various wireless access environments, SDR technology enables seamless global communication by downloading an object-oriented software application in a single hardware platform having open architecture. In addition, SDR technology enables one system to accommodate various standards currently available in the mobile communication market. Therefore, SDR technology is considered as a system building technology capable of providing multiple standards, multiple processing frequencies, and various services.

As described above, SDR technology refers to a wireless system capable of software-reconfiguring the entire system functions. Attempts to develop, standardize, and commercialize the relevant technologies are being made through SDR Forum.

Although the importance of SDR technology is widely recognized, the current research is being conducted restrictively to a SDR base station by communication equipment manufacturers. In particular, there is no research on a SDR terminal. Therefore, for actual application of SDR technology, there is a need for extensive research on a new terminal system architecture combined of the latest hardware technology and software-related mobile communication technology.

SUMMARY OF THE INVENTION

An aspect of the present invention is to address at least the problems and/or disadvantages and to provide at least the advantages described below. Accordingly, one aspect of the present invention is to provide a sample rate conversion apparatus and method capable of reducing complexity and power consumption in a SDR communication system.

Another aspect of the present invention is to provide a scheme capable of generating a variable clock using a specific parameter for a frequency output from a Digital Phase Locked Loop (DPLL) and an integer part and a fractional part of a desired symbol clock.

Another aspect of the present invention is to provide a symbol rate conversion scheme capable of reducing a dynamic range and a step size by generating a variable clock corresponding to a symbol rate.

Yet another aspect of the present invention is to provide a symbol clock generation scheme having low complexity and high flexibility by implementing integer scaling and fractional scaling.

Still another aspect of the present invention is to provide a scheme capable of acquiring accurate samples during fractional sample rate conversion in sample rate conversion technology.

According to one aspect of the present invention, there is provided a method for converting a sample rate in a Software Defined Radio (SDR) communication system. The method includes setting a sampling frequency range depending on a maximum sampling frequency and a minimum sampling frequency so as to enable support of a plurality of sample rates; if a required sampling frequency is set, determining a control value for converting the maximum sampling frequency to the required sampling frequency; and receiving a signal having the maximum sampling frequency, and converting the signal having the maximum sampling frequency to a signal having the required sampling frequency depending on the control value. The control value is determined taking into account a maximum sampling frequency for setting the sampling frequency range.

According to another aspect of the present invention, there is provided an apparatus for converting a sample rate in a Software Defined Radio (SDR) communication system. The apparatus includes a baseband processor for setting a maximum sampling frequency and a minimum sampling frequency for specifying a sampling frequency range so as to enable support of a plurality of sample rates, and determining a control value for converting the maximum sampling frequency to the required sampling frequency; a Digital Phase Locked Loop (DPLL) for receiving a signal having the maximum sampling frequency, and performing primary frequency scaling on the signal having the maximum sampling frequency depending on the control value; and a frequency divider for performing secondary frequency scaling on the primary frequency scaling-processed signal depending on the control value. The control value is determined taking into account a maximum sampling frequency for setting the sampling frequency range.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
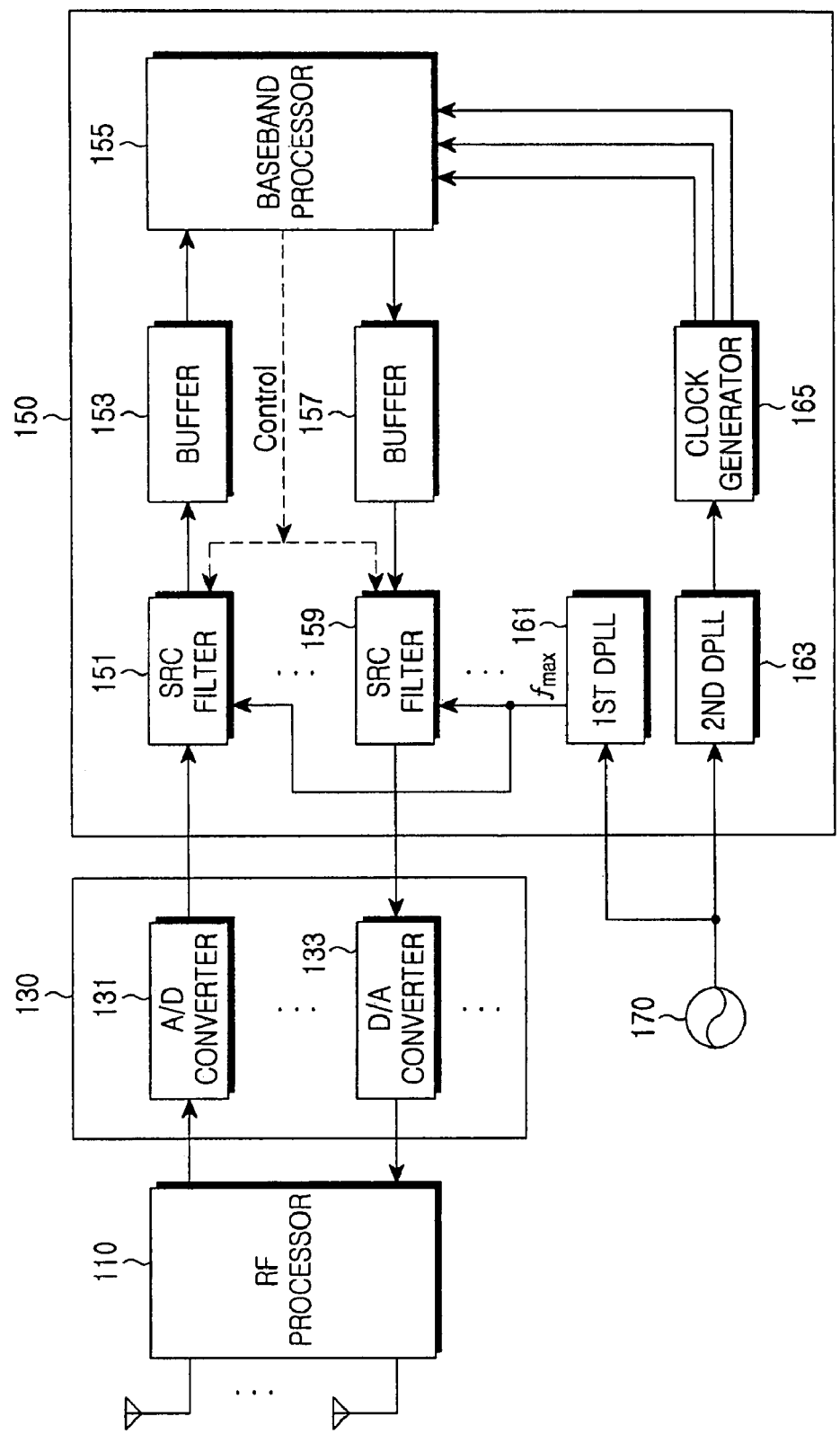
FIG. 1 is a schematic diagram illustrating function blocks of a conventional SDR system.

Several exemplary embodiments of the present invention will now be described in detail with reference to the annexed drawings. In the following description, a detailed description of known functions and configurations incorporated herein has been omitted for clarity and conciseness.

Generally, Software Defined Radio (SDR) technology refers to hardware technology, software technology and a system thereof, capable of implementing a wireless system whose entire system functions are reconfigurable by software.

An SDR system is a comprehensive system including antenna, Radio Frequency (RF) unit, Analog/Digital (A/D) converter, Digital/Analog (D/A) Converter, baseband modem, modulo software, signal processing algorithm, and the like. Further, the SDR system flexibly software-implements the existing mobile communication platform which is fixed by hardware. Therefore, the SDR system also means a mobile communication system that can software-reconfigure the entire system functions so as to support various modulation waves based on a communication scheme, and multiple bands and multiple modes for various air interface criteria.

The final goal of the research on the SDR system is to make a single wireless platform that can reconfigure the entire system by software so as to support all wireless communication criteria having various usages. For a perfect SDR system, research not only on base station, terminal and network-based hardware part, but also on possible service, communication standard and specification, used band, and compatibility with the currently available schemes, is essential.

For implementation of an SDR terminal, a flexible system is configured by maximally shifting reconfigurable signal processing parts from a base band to an Intermediate Frequency (IF) or RF band, using high-performance Digital Signal Processor (DSP), fast-reconfigurable Field Programmable Gate Array (FPGA), broadband A/D converter, broadband D/A converter, and the like.

Like the general terminal design condition for mobile communication, the essential condition of the SDR terminal can include lightweight, low power, low price, low complexity, high flexibility, etc. In order to design a terminal satisfying all the conditions, there is a great need for introduction of open architecture through digital signal processing.

In the SDR terminal, an over-the-air scheme for wirelessly downloading software not only over a channel for communication but also over a download channel, and a hardware scheme for downloading software by hardware using a smart card are under discussion.

The general software download scheme is generally applied to the Internet field rather than the mobile communication field, and is popularly used by both the user and the relevant companies for its conveniences even though it has low-rate and low-stability problems. Presently, the high-speed modem and x-Digital Subscriber Line (xDSL) technologies are in use, and these are applied even to the next generation mobile communication apparatus such as the SDR apparatus in which the software function is considered important.

FIG. 1 illustrates schematic blocks of a conventional SDR system.

In FIG. 1, a configuration of a conventional SDR terminal includes an RF processor 110, a data converter 130, a baseband modem 150 and an oscillator 170.

The data converter 130 includes a plurality of A/D converters 131 and a plurality of D/A converters 133. The baseband modem 150 includes a plurality of Sample Rate Conversion (SRC) filters 151 to 159, a plurality of buffers 153 to 157, a baseband processor 155, first and second Digital Phase Locked Loops (DPLLs) 161 and 163, and a clock generator 165.

The RF processor 110 takes charge of transmission/reception of RF signals, and is composed of a transmitter and a receiver. The RF processor 110 down-converts a signal received via a reception antenna into an IF-band signal, and outputs the resulting signal to the A/D converters 131 in the data converter 130. In addition, the RF processor 110 performs RF processing on the analog signal output from the D/A converters 133 in the data converter 130, and transmits the resulting signal to via a transmission antenna over the air.

The A/D converters 131 in the data converter 130 convert analog signals output from the RF processor 110 into digital signals, and output the resulting signals to the baseband modem 150. In addition, the D/A converters 133 in the data converter 130 convert the digital signals output from the baseband modem 150 into analog signals, and output the resulting signals to the RF processor 110. Herein, the data converter 130 determines its resolution and sampling rate according to the system specification.

The baseband modem 150 performs digital data processing. The baseband modem 150 includes transmission/reception parts connected to the A/D converters 131 and the D/A converters 133.

In operation of the baseband modem 150, SRC filters 151 to 159 perform SRC according to a sample frequency generated in the oscillator 170 and a control signal from the baseband processor 155.

The baseband processor 155 performs channel coding, such as convolution coding or turbo coding, interleaving, and digital modulation. The digital modulation is performed by Quadrature Phase Shift Keying (QPSK), Quadrature Amplitude Modulation (QAM), and the like. The baseband processor 155 receives a clock necessary for channel coding, provided from the clock generator 165.

The foregoing SDR terminal can operate with a fixed clock without configuring a variable DPLL. In addition, the SDR terminal can convert sample rates through digital signal processing. In particular, the SDR terminal, when it performs integer sample rate conversion, is simple in configuration of the SRC filters, increasing the efficiency.

However, the configuration shown in FIG. 1 considerably increases in hardware complexity in order to extract various sample rates, for example, integer and fractional sample rates. In addition, the configuration of FIG. 1 increases in power consumption as its operation frequency increases. Further, the configuration of FIG. 1, when it supports a Multi Input Multi Output (MIMO) system, increases in the complexity in proportion to the number of antennas.

A scheme of generating a desired sample frequency through a fully-variable DPLL has been proposed. That is, there has been proposed a modified configuration of FIG. 1 in which the first DPLL 161 is configured with a variable DPLL and the SRC filters 151 to 159 are replaced with simple low-pass filters. In other words, the proposed configuration generates a desired clock frequency using the high-performance DPLL, thereby facilitating the simple system configuration. However, even this configuration has difficulty in implementing a DPLL that satisfies all DPLL characteristics, for example, larger frequency range, high resolution, phase noise covering a power band, and locking time covering the entire band, so it is hard to implement the proposed configuration.

Accordingly, an embodiment of the present invention provides a sampling conversion scheme that uses a DPLL and a frequency divider in a SDR system. For example, the present invention provides a Sampling conversion scheme based on the DPLL and the frequency divider, in order to solve the high-power consumption and high-complexity problems occurring in the existing SRC filter-based configuration.

Generally, a symbol clock generation scheme determines desired frequency range and resolution through Phase Locked Loop (PLL) characteristics. Therefore, the symbol clock generation scheme has limitation in supporting the frequency range and resolution needed in multiple modes. Thus, a scheme of generating a clock corresponding to a symbol rate according to an embodiment of the present invention generates a variable clock through a parameter, for a frequency output from a PLL, and an integer part and a fractional part of a desired symbol clock, thereby reducing dynamic range and step size of the PLL.

The present invention implements integer scaling and fractional scaling through a combination of the general PLL device and an integer frequency scaler implemented in a newly proposed digital processing part, thereby providing a low-complexity, high-flexibility symbol clock generation scheme. In addition, the present invention can be applied to all systems that desire to support SDR technology.

Figure 4:
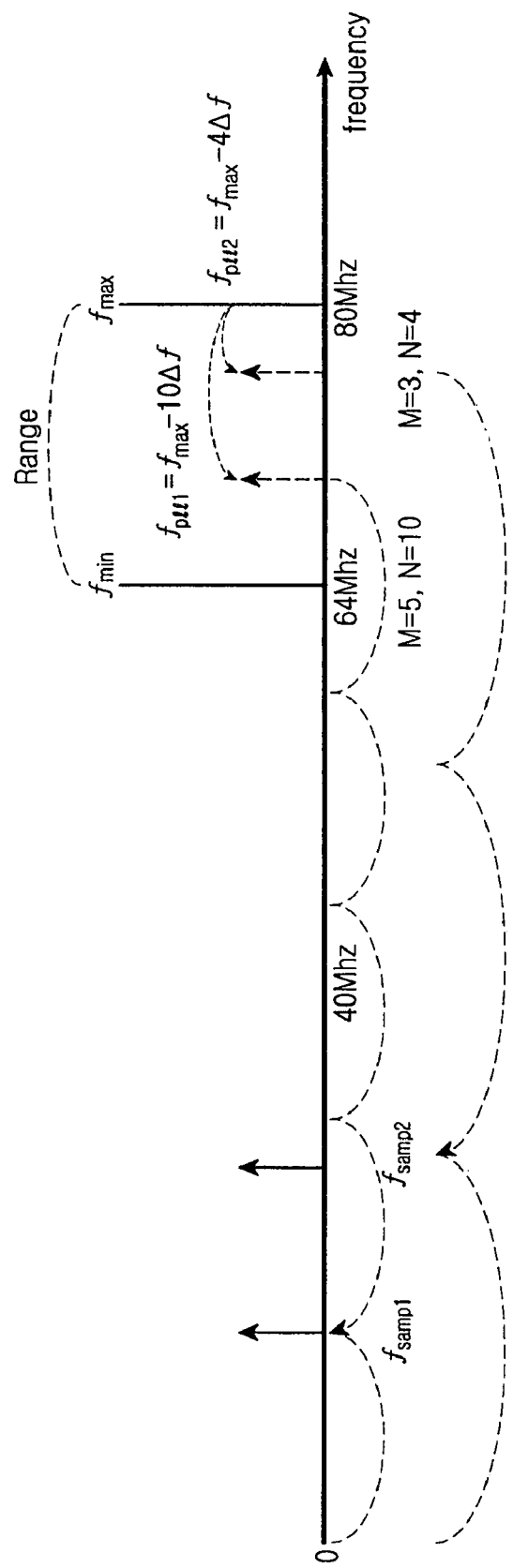
FIG. 4 is a frequency diagram illustrating an operational principle of converting a sampling rate in a SDR communication system according to an embodiment of the present invention.

FIG. 4 is frequency diagram illustrating an operational principle of converting a sampling rate in an SDR communication system according to an embodiment of the present invention.

In FIG. 4, the principle determines a maximum sampling frequency $f_{max}$ and a minimum sampling frequency $f_{min}$ so as to enable support of a plurality of sample rates. A sampling frequency range is set depending on the maximum sampling frequency $f_{max}$ and the minimum sampling frequency $f_{min}$. In FIG. 4, the maximum sampling frequency $f_{max}$ is determined as 80 Mhz and the minimum sampling frequency $f_{min}$ is determined as 64 Mhz, by way of example.

Therefore, as all desired sampling frequencies used in the SDR communication system are multiplied by an arbitrary integer M, the multiplied resulting frequencies exist in the sampling frequency range. The arbitrary integer M is determined such that a product frequency calculated by the product of the required sampling frequency and the arbitrary integer is located in the sampling frequency range. The arbitrary integer M may have a different value for each sampling frequency.

For example, in FIG. 4, two sampling frequencies $f_{samp1}$ and $f_{samp2}$ are provided. For a first sampling frequency $f_{samp1}$ out of the two sampling frequencies $f_{samp1}$ and $f_{samp2}$, a first product frequency $f_{pll1}$ corresponding to M=5 exists in the sampling frequency range, and for a second sampling frequency $f_{samp2}$, a second product frequency $f_{pll2}$ corresponding to M=3 exists in the sampling frequency range. That is, the arbitrary integer M corresponding to the first sampling frequency $f_{samp1}$ is determined as 5, and the arbitrary integer M corresponding to the second sampling frequency $f_{samp2}$ is determined as 3.

In addition, the frequency, which is located in the sampling frequency range as a result of the product of the sampling frequencies and the arbitrary integer, has a specific error value N with respect to the maximum sampling frequency $f_{max}$ that determines the sampling frequency range. The specific error value N is used to obtain a sampling frequency required according to a desired sampling rate to be converted from the maximum sampling frequency $f_{max}$. The error value N is defined depending on multiple steps obtained by dividing the sampling frequency range by a specific frequency range $\Delta f$. Here, the error value N corresponds to the number of steps existing between the product frequency located in the sampling frequency range and the maximum sampling frequency $f_{max}$. In addition, an error frequency is calculated by the product of the error value N and a frequency range $\Delta f$ of each step.

In FIG. 4, because the number of steps between the first product frequency $f_{pll1}$ and the maximum sampling frequency $f_{max}$ is 10, the error frequency is $10 \times \Delta f$. In addition, because the number of steps between the second product frequency $f_{pll2}$ and the maximum sampling frequency $f_{max}$ is 4, the error frequency is $4 \times \Delta f$. Therefore, the first product frequency $f_{pll1}$ can be calculated by subtracting the error frequency $10 \times \Delta f$ from the maximum sampling frequency $f_{max}$, and the second product frequency $f_{pll2}$ can be calculated by subtracting the error frequency $4 \times \Delta f$ from the maximum sampling frequency $f_{max}$.

Although the scheme of using the error value between the maximum sampling frequency $f_{max}$ and the product frequency is provided in FIG. 4, a scheme of using an error value between the minimum sampling frequency $f_{min}$ and the product frequency can also be taken into consideration.

If the arbitrary integer M and the error value N are determined for each sampling frequency in the foregoing manner, it is easy to generate a signal having a desired sampling frequency from a signal having the maximum sampling frequency $f_{max}$. That is, the desired sampling frequency can be acquired by subtracting the error frequency calculated by the error value N from the maximum sampling frequency $f_{max}$, and then dividing the subtracted frequency by the arbitrary integer M.

In addition, the arbitrary integer M and the error value N can be defined depending on a quotient obtained by dividing the maximum sampling frequency $f_{max}$ by a desired sampling frequency. Here, in the quotient, an integer part corresponds to the arbitrary integer M and a fractional part corresponds to the error value N.

Figure 2:
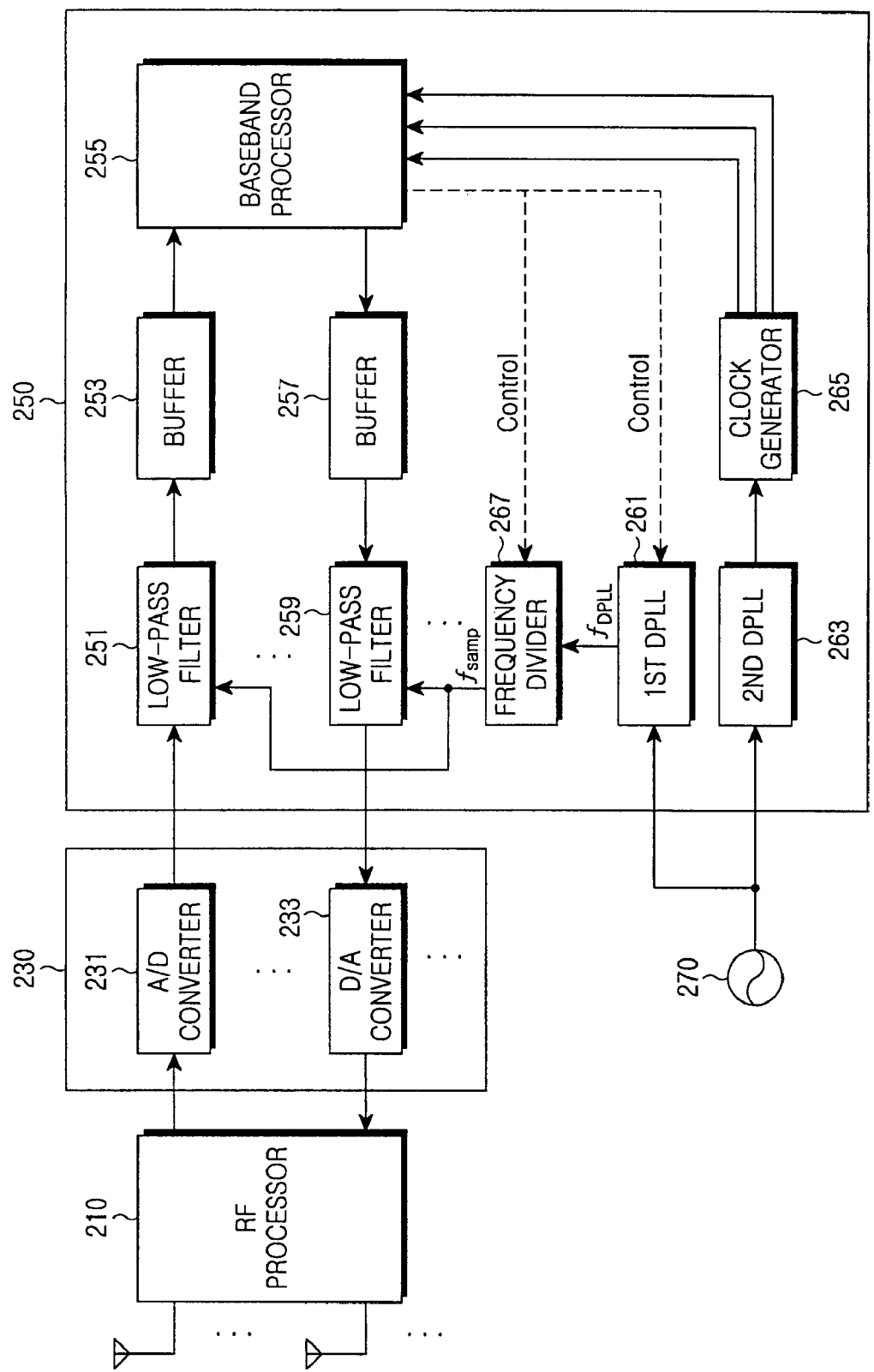
FIG. 2 is a schematic diagram illustrating function blocks of a SDR terminal constituting a SDR system according to an embodiment of the present invention.

FIG. 2 schematically illustrates function blocks of a SDR terminal constituting a SDR system according to an embodiment of the present invention.

In FIG. 2, a data converter 230 includes a plurality of A/D converts 231 and D/A converters 233. A baseband modem 250 includes a plurality of Low-Pass Filters (LPFs) 251 to 259, a plurality of buffers 253 to 257, a baseband processor 255, first and second DPLLs 261 and 263, a clock generator 265, and a frequency divider 267.

An RF processor 210 takes charge of transmission/reception of RF signals, and is composed of a transmitter and a receiver. The RF processor 210 down-converts a signal received via a reception antenna into an IF-band signal, and outputs the resulting signal to the A/D converters 231 in the data converter 230. In addition, the RF processor 210 performs RF processing on the analog signal output from the D/A converters 233 in the data converter 230, and transmits the resulting signal to via a transmission antenna over the air.

The A/D converters 231 in the data converter 230 convert the analog signals output from the RF processor 210 into digital signals, and output the resulting signals to the baseband modem 250. In addition, the D/A converters 233 in the data converter 230 convert the digital signals output from the baseband modem 250 into analog signals, and output the resulting signals to the RF processor 210.

The baseband modem 250 performs digital data processing. The baseband modem 250 includes transmission/reception parts connected to the A/D converters 231 and the D/A converters 233.

In operation of the baseband modem 250, the low-pass filters 251 to 259 perform SRC according to a sample frequency generated in an oscillator 270. The low-pass filter 251 operates according to a sampling frequency $f_{samp}$ provided from the frequency divider 267.

The baseband processor 255 performs channel coding, such as convolution coding or turbo coding, interleaving, and digital modulation. The digital modulation is performed by Quadrature Phase Shift Keying (QPSK), Quadrature Amplitude Modulation (QAM), and the like. The baseband processor 255 receives a clock necessary for channel coding, provided from the clock generator 265.

In addition, the baseband processor 255 according to an embodiment of the present invention generates a second control value for scaling a clock of a fractional frequency part in the first DPLL 261, and a first control value for scaling a clock of an integer frequency part in the frequency divider 267.

The baseband processor 255 also generates the first control value and the second control value according to a sampling frequency. The sampling frequency corresponds to a bandwidth given taking the system condition into account. Thereafter, the baseband processor 255 delivers the generated first control value and the second control value to the frequency divider 267 and the first DPLL 261, respectively.

The first DPLL 261 provides the frequency divider 267 with an output frequency $f_{DPLL}$ obtained by dividing the sample frequency received from the oscillator 270 by the second control value provided from the baseband processor 255. The second control value is a control value for scaling a clock of the fractional frequency part in the first DPLL 261.

The frequency divider 267 takes charge of sampling rate conversion. Specifically, the frequency divider 267 provides the low-pass filters 251 to 259 with a sampling frequency $f_{samp}$ obtained by dividing the output frequency $f_{DPLL}$ received from the first DPLL 261 by the first control value provided from the baseband processor 255. The first control value is a control value for scaling a clock of the integer frequency part in the frequency divider 267.

As described above, the present invention provides a sampling rate conversion scheme that uses a DPLL and a frequency divider. The first DPLL according to an embodiment of the present invention limits the frequency range, and separately implements an integer part and a fractional part. Preferably, the integer part is applied to the frequency divider, and the fractional part is applied to the first DPLL. A calculation method for the integer part and the fractional part will be described herein below.

Figure 3:
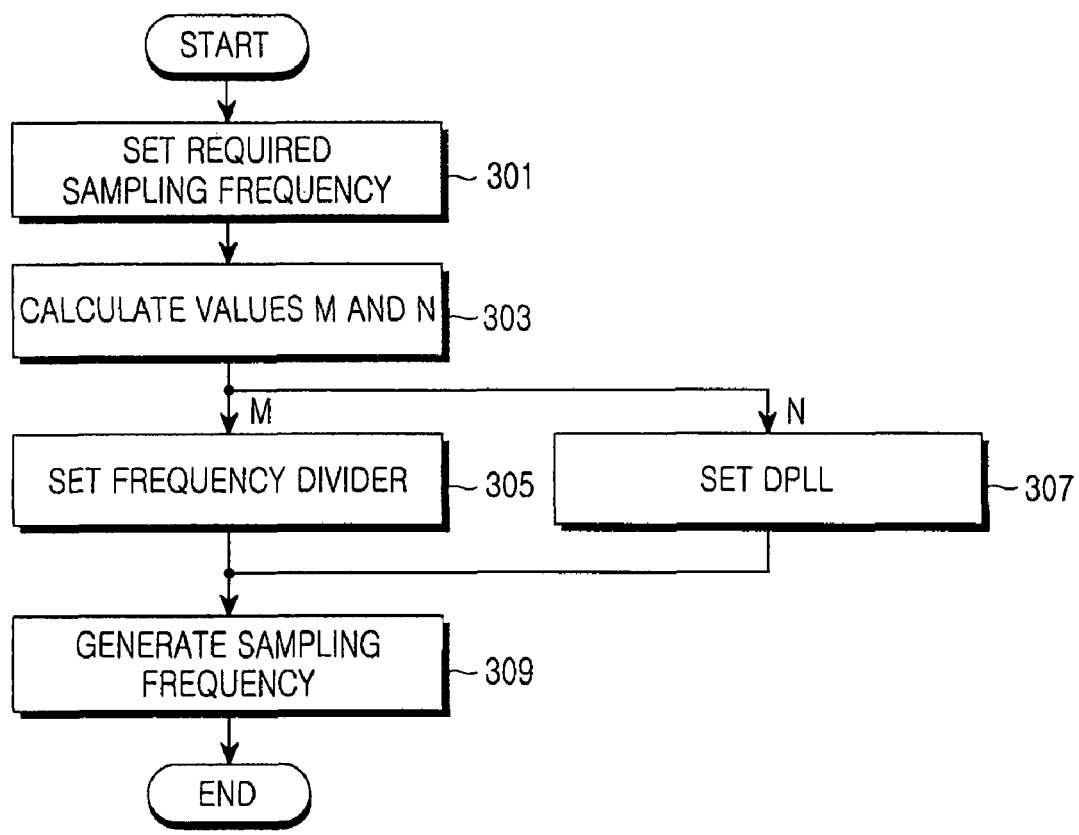
FIG. 3 is a flow diagram illustrating a method for converting a sampling rate according to an embodiment of the present invention.

FIG. 3 is a flow diagram illustrating a process for converting a sampling rate according to an embodiment of the present invention.

In FIG. 3, a baseband modem sets a required sampling frequency in step 301. After setting the required sampling frequency, the baseband modem then calculates, in step 303, first and second control values, for example, M and N, for clock scaling, according to the sampling frequency.

For example, if it is assumed in step 301 that the required sampling frequency is 32 MHz, a DPLL frequency range spans from 64 MHz to 80 MHz, and a DPLL frequency resolution is 1 MHz, the baseband modem can calculate M=2 and N=16. Herein, the first control value M is a value for scaling a clock of an integer frequency part in the frequency divider according to an embodiment of the present invention, for example, a value for dividing a reference clock. The second control value N is a value for scaling a clock of a fractional frequency part in the DPLL according to an embodiment of the present invention, for example, a value for dividing a reference clock.

That is, for acquisition of a desired sample rate, an embodiment of the present invention divides a ratio of a reference clock frequency of a DPLL to a desired sample clock frequency into an integer frequency part and a fractional frequency part. This can be expressed as Equation (1):

$$\frac{f_{max}}{f_{samp}} = M_{int} + N_{frac} = m + \frac{n \cdot \Delta f}{f_{samp}} \quad (1)$$

In Equation (1), $f_{max}$ denotes a reference clock frequency of a DPLL, $f_{samp}$ denotes a desired sample clock frequency, $M_{int}$ denotes an integer frequency part for integer clock scaling in a frequency divider, and $N_{frac}$ denotes a fractional frequency part for fractional clock scaling in a DPLL.

Next, an output frequency of the DPLL can be expressed as Equation (2):

$$f_{DPLL} = f_{max} - n \cdot \Delta f, 0 \leq n \leq f_{range}/\Delta f \quad (2)$$

In Equation (2), $f_{DPLL}$ denotes an output frequency of a DPLL, and n denotes a step size, i.e. frequency resolution.

As described above, an embodiment of the present invention implements the integer frequency part using a digital logic, thereby advantageously reducing the frequency range and step size that the existing PLL needs to cover.

Referring back to FIG. 3, the baseband modem sets a frequency divider using the calculated first control value M in step 305, and sets a DPLL using the calculated second control value N in step 307. After setting the frequency divider and the DPLL, the baseband modem generates a sampling frequency in step 309.

For example, the DPLL generates in step 307 its output frequency $f_{DPLL}$ using the N and delivers the output frequency $f_{DPLL}$ to the frequency divider, and the frequency divider generates in step 305 a desired sampling frequency $f_{samp}$ using the output frequency $f_{DPLL}$ and the M and delivers the desired sampling frequency $f_{samp}$ to each low-pass filter.

Examples of the M and the N according to an embodiment of the present invention, provided separately for the supportable systems, can be shown in Table 1.

TABLE 1

| Supporting Standard | Channel Bandwidth [MHz] | Sampling Frequency [MHz] | Required Sampling Frequency | N | N |
|---|---|---|---|---|---|
| 802.11n | 20 | 20 | 40 | 0 | 2 |
|  | 40 | 40 | 80 | 0 | 0 |
| 802.16e | 1.25 | 1.4 | 2.8 | 225 | 26 |
|  | 3.5 | 4 | 8 | 0 | 10 |
|  | 7 | 8 | 16 | 0 | 5 |
|  | 8.75 | 10 | 20 | 0 | 4 |
|  | 14 | 16 | 32 | 500 | 2 |
|  | 17.5 | 20 | 40 | 0 | 2 |
|  | 28 | 32 | 64 | 500 | 1 |
| CDMA | 1.25 | 1.2288 | 4.9152 | 196 | 15 |
| WCDMA | 5 | 3.84 | 15.36 | 100 | 5 |
| CDMA2000 | 5 | 3.6864 | 14.7456 | 196 | 5 |

In Table 1, the DPLL specification is defined by the frequency range and the step size, by way of example.

Next, a performance comparison between the proposed scheme, the existing scheme, and the fully-variable DPLL-based scheme can be shown in Table 2.

TABLE 2

|  | SRC filter | Fully Variable DPLL | Proposed |
|---|---|---|---|
| Complexity | Upper | Middle | Lower |
| Sample Accuracy | Middle | Upper | Upper |
| Power Consumption | Upper | Middle | Lower |
| Implementation Difficulty | Middle | Upper | Middle |
| Die size | Upper | Middle | Lower |

As shown in Table 2, the existing scheme, i.e. symbol clock generation scheme, determines a desired frequency range and a frequency resolution using the DPLL characteristics. As a result, the existing scheme has limitation in supporting the frequency range and resolution needed in the multiple modes. Compared with the existing scheme, the proposed scheme of generating a clock corresponding to a symbol rate generates a variable clock through a specific parameter, for a frequency output from the DPLL, and an integer part and a fractional part of the designed symbol clock, thereby reducing the dynamic range and the step size of the DPLL as shown in Table 2.

In addition, an embodiment of the present invention simultaneously implements integer scaling and fractional scaling through a combination of the existing DPLL apparatus and the integer frequency scaler implemented in the newly proposed digital part, thereby also reducing the complexity and increasing the flexibility as shown in Table 2.

As described above, the present invention provides a symbol clock generation scheme that can be implemented in all systems that the SDR system supports.

As can be understood from the foregoing description, the sample rate conversion apparatus and method in the SDR communication system according to the present invention generates a variable clock through a specific parameter, for a frequency output from a DPLL and a integer part and a fractional part of a desired symbol clock, thereby reducing a dynamic range and a step size of the DPLL. In addition, the apparatus and method simultaneously implements integer scaling and fractional scaling, thereby reducing the complexity and increasing the flexibility.

In addition, the present invention can solve the power consumption, complexity, and die size problems of the existing configuration implemented with the sample rate conversion filter. Further, the present invention can implement the SDR system on a fully flexible basis, and can prevent the possible degradation in sample accuracy, which may occur in the SRC filters. Moreover, the present invention moderates the DPLL specification, thereby facilitating the efficient SRC implementation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for converting a sample rate in a Software Defined Radio (SDR) communication system, the method comprising:
    setting a sampling frequency range depending on a maximum sampling frequency and a minimum sampling frequency so as to enable support of a plurality of sample rates;
    determining a control value for converting the maximum sampling frequency to a required sampling frequency; and
    receiving a signal having the maximum sampling frequency, and converting the signal having the maximum sampling frequency to a signal having the required sampling frequency depending on the control value;
    wherein the control value is determined taking into account the maximum sampling frequency for setting the sampling frequency range, and
    wherein the control value includes a fractional frequency part and an integer frequency part, the integer frequency part indicating an integer value obtained by dividing the maximum sampling frequency by the required sampling frequency, and the fractional frequency part indicating a fractional value obtained by dividing the maximum sampling frequency by the required sampling frequency.

2. The method of claim 1, wherein the control value includes an arbitrary integer for allowing a product frequency calculated depending on a product of the required sampling frequency and the arbitrary integer to be located in the sampling frequency range, and a step value for correcting an error frequency between the product frequency and the maximum sampling frequency.

3. The method of claim 2, wherein the step value is determined by dividing the sampling frequency range into a plurality of steps having a specific frequency range, and then defining the step value as the number of steps, that corresponds to an error value between the product frequency and the maximum sampling frequency.

4. The method of claim 3, wherein the conversion includes:
    scaling the fractional frequency part for the signal having the maximum sampling frequency depending on the number of steps;
    scaling the integer frequency part for the fractional frequency part-scaled signal depending on the arbitrary integer; and
    outputting the integer frequency part-scaled signal as a signal having the required sampling frequency.

5. The method of claim 4, wherein the fractional frequency part-scaled signal includes one of a remainder signal and a difference signal having a remainder frequency or a difference frequency obtained by subtracting, from the maximum sampling frequency, an error frequency determined depending on the number of steps.

6. The method of claim 5, wherein the integer frequency part-scaled signal includes a division signal having a quotient frequency obtained by dividing one of the remainder frequency and difference frequency by the arbitrary integer.

7. An apparatus for converting a sample rate in a Software Defined Radio (SDR) communication system, the apparatus comprising:
- a baseband processor for setting a maximum sampling frequency and a minimum sampling frequency for specifying a sampling frequency range so as to enable support of a plurality of sample rates, and determining a control value for converting the maximum sampling frequency to a required sampling frequency;
- a Digital Phase Locked Loop (DPLL) for receiving a signal having the maximum sampling frequency, and performing primary frequency scaling on the signal having the maximum sampling frequency depending on the control value; and
- a frequency divider for performing secondary frequency scaling on the primary frequency scaling-processed signal depending on the control value;
- wherein the control value is determined taking into account the maximum sampling frequency for specifying the sampling frequency range, and
- wherein the control value includes a fractional frequency part and an integer frequency part, the integer frequency part indicating an integer value obtained by dividing the maximum sampling frequency by the required sampling frequency, and the fractional frequency part indicating a fractional value obtained by dividing the maximum sampling frequency by the required sampling frequency.

8. The apparatus of claim 7, wherein the baseband processor determines, as a first control value, an arbitrary integer for allowing a product frequency calculated depending on a product of the required sampling frequency and the arbitrary integer to be located in the sampling frequency range, and determines, as a second control value, a step value for correcting an error frequency between the product frequency and the maximum sampling frequency.

9. The apparatus of claim 8, wherein the step value is determined by dividing the sampling frequency range into a plurality of steps having a specific frequency range, and then defining the step value as the number of steps, that corresponds to an error value between the product frequency and the maximum sampling frequency.

10. The apparatus of claim 9, wherein the DPLL performs the primary frequency scaling for scaling the fractional frequency part for the signal having the maximum sampling frequency depending on the number of steps.

11. The apparatus of claim 10, wherein the frequency divider performs the secondary frequency scaling for scaling the integer frequency part for the fractional frequency part-scaled signal depending on the arbitrary integer, and outputs the integer frequency part-scaled signal as a signal having the required sampling frequency.

12. The apparatus of claim 11, wherein the DPLL outputs, as the fractional frequency part-scaled signal, one of a remainder signal and a difference signal having a remainder frequency or a difference frequency obtained by subtracting, from the maximum sampling frequency, an error frequency determined depending on the number of steps.

13. The apparatus of claim 12, wherein the frequency divider outputs, as the integer frequency part-scaled signal, a division signal having a quotient frequency obtained by dividing one of the remainder frequency and difference frequency by the arbitrary integer.

14. The method of claim 1, wherein determining the control value for converting the maximum sampling frequency to the required sampling frequency comprises calculating the control value using the maximum sampling frequency setting for the sampling frequency range.

15. The method of claim 1, wherein the signal having the maximum sampling frequency is separate from the control value.

16. The apparatus of claim 7, wherein the signal having the maximum sampling frequency is separate from the control value.

* * * * *